WILLIAM GUILFOYLE.
Improvement in Machines for Pressing and Stuffing Horse-Collars.
No. 115,727. Patented June 6, 1871.
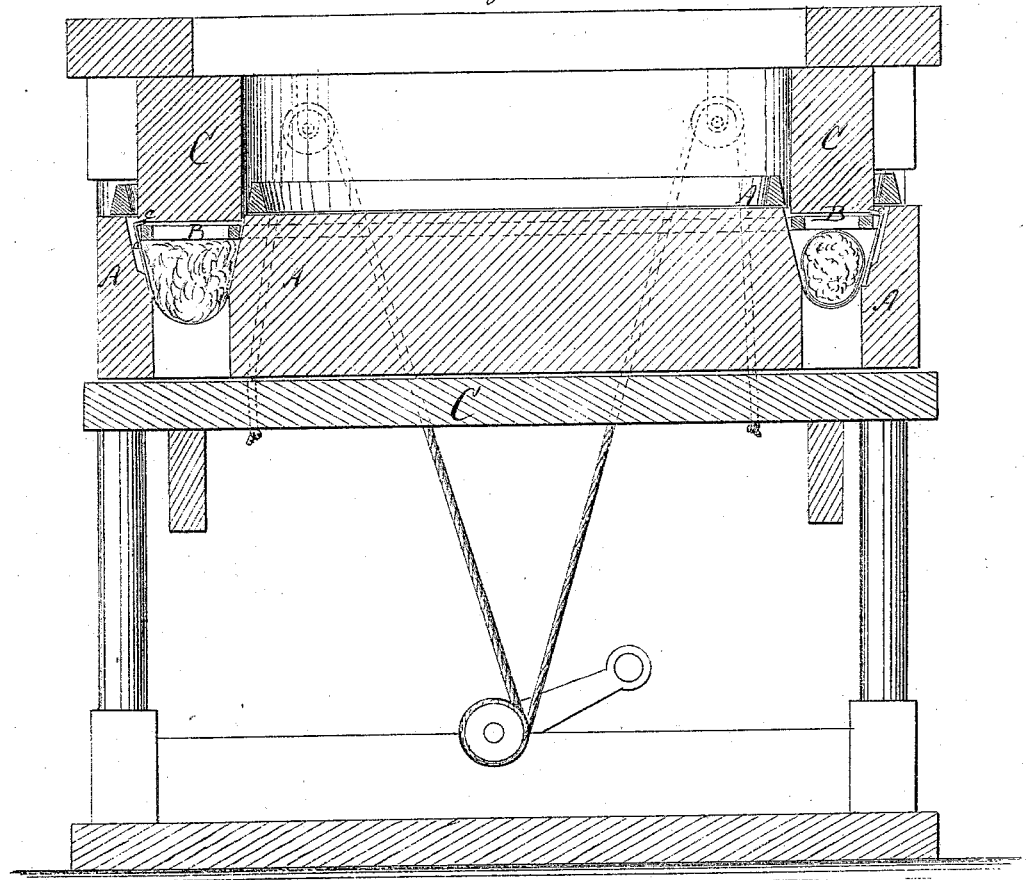
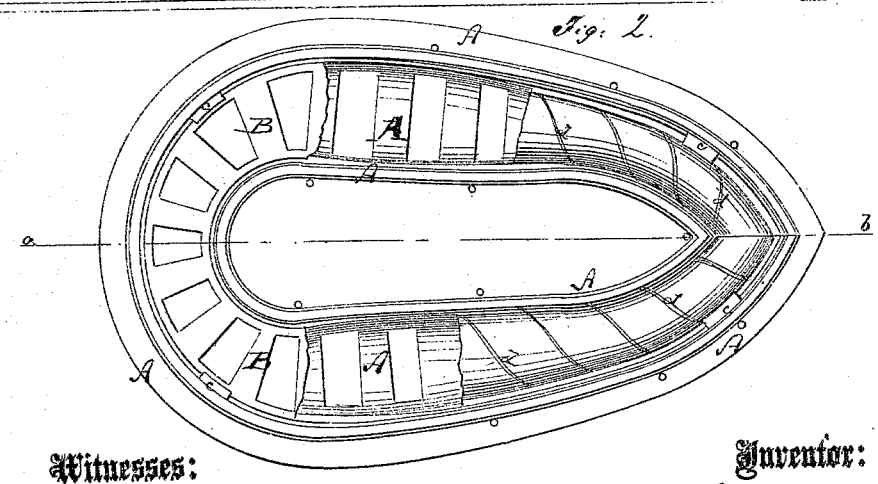

UNITED STATES PATENT OFFICE.

WILLIAM GUILFOYLE, OF NEW YORK, N. Y.

IMPROVEMENT IN MACHINES FOR PRESSING AND STUFFING HORSE-COLLARS.

Specification forming part of Letters Patent No. 115,727, dated June 6, 1871.

*To all whom it may concern:*

Be it known that I, WILLIAM GUILFOYLE, of New York, in the county and State of New York, have invented a new and Improved Machine for Pressing the Stuffing of Horse-Collars; and I do hereby declare that the following is a full, clear, and exact description thereof, which will enable others skilled in the art to make and use the same, reference being had to the drawing accompanying this specification.

Figure 1 represents a vertical longitudinal section of my improved horse-collar, the line $a$ $b$, Fig. 1, indicating the plane of section. Fig. 2 is a plan or top view, partly in section, of the stuffing-mold.

Similar letters of reference indicate corresponding parts.

This invention relates to a new apparatus for preparing the stuffing of horse-collars; and consists in the use of a perforated mold and perforated compressing-plate, all so arranged that the straw or other material can be properly compressed and shaped and tied while in the mold.

A in the drawing represents the stuffing-mold. It is made of metal or other material, of such shape that the straw or other substance put into it will assume the form and size of a horse-collar stuffing. The mold is deeper than the thickness of stuffing, its upper part constituting a hopper for receiving the straw in a loose state. B is a plate made of metal or other material, of such form and size that it will nicely fit the mold when put into the same, as shown. The bottom of the mold is perforated, and so is also the plate B.

The straw to be pressed is put into the mold, the plate B laid upon it, and then forced down by means of suitable press C, such as that shown in Fig. 1, or of other kind, until the straw is properly compressed. This fact is determined when the plate B arrives under spring-catches $c$ $c$, which are arranged on the sides of the mold. The catches hold the plate down upon the compressed straw, which can then be tied by cords $d$ drawn through the apertures of the mold and plate, and wound spirally around the straw while the same is in the mold. When it has been properly tied the straw is taken out, and constitutes a complete stuffing for the horse-collar, which has only to be lined with leather or other material to complete the collar. A piece of linen or other fabric may be placed within the mold to surround the straw for the purpose of better shaping it and protecting the leather from internal wear. The stuffing for the large part or main body of the collar is made in one mold, and that for the small part in another, the two being firmly put together to be lined.

By this arrangement of preparing the stuffing the collar will be evenly and equally elastic throughout. Heretofore the leather was usually first sewed and the stuffing then crowded in at the end, leaving some parts more stuffed than the others, and causing a chafing of the animals at the harder parts. In place of the spring-catches sliding bolts or levers may be used.

Having thus described my invention, I claim as new and desire to secure by Letters Patent—

1. The perforated mold A and perforated plate B, combined to constitute an apparatus for preparing horse-collar stuffing, as set forth.

2. The spring-catches $c$ $c$, arranged within the mold to hold down the perforated plate B, substantially as herein set forth and described.

WILLIAM GUILFOYLE.

Witnesses:
   T. B. MOSHER,
   W. C. PIKE.